United States Patent [19]
Shiell

[11] Patent Number: 5,911,057
[45] Date of Patent: Jun. 8, 1999

[54] SUPERSCALAR MICROPROCESSOR HAVING COMBINED REGISTER AND MEMORY RENAMING CIRCUITS, SYSTEMS, AND METHODS

[75] Inventor: Jonathan H. Shiell, Plano, Tex.

[73] Assignee: Texas Instruments Incorporated, Dallas, Tex.

[21] Appl. No.: 08/769,825

[22] Filed: Dec. 19, 1996

[51] Int. Cl.⁶ ................................................. G06F 9/00
[52] U.S. Cl. .................. 395/393; 395/561; 395/800.23
[58] Field of Search ............................ 395/800.23, 393, 395/561, 378, 800.41

[56] References Cited

U.S. PATENT DOCUMENTS

| | | | |
|---|---|---|---|
| 4,752,873 | 6/1988 | Shonai et al. | 395/800.23 |
| 5,355,457 | 10/1994 | Shebanow et al. | 395/394 |
| 5,579,263 | 11/1996 | Teel et al. | 365/189.02 |
| 5,630,097 | 5/1997 | Orbits et al. | 711/165 |
| 5,630,157 | 5/1997 | Dwyer, III | 395/800.23 |
| 5,655,098 | 8/1997 | Witt et al. | 395/386 |
| 5,822,558 | 10/1998 | Tran | 395/389 |
| 5,838,941 | 11/1998 | Valentine et al. | 395/393 |

OTHER PUBLICATIONS

ARB: a hardware mechanism for dynamic reordering of memory references by Franklin et al., IEEE publication, vol. 45, No. 5, May 1996, pp. 552–571.

*Primary Examiner*—Zarni Maung
*Attorney, Agent, or Firm*—Robert D. Marshall, Jr.; Gerald E. Laws; Richard L. Donaldson

[57] ABSTRACT

Circuits, systems, and methods of operating a processor (110) to process a plurality of instructions, wherein each of the plurality of instructions has a respective sequence number. Further, selected ones of the plurality of instructions are for accessing a non-register memory (18). For each of the selected ones of the plurality of instructions, the method comprises the following steps. One step (24) receives the instruction and another (26) decodes the received instruction. Yet another step (30) stores a plurality of instruction characteristics in a table (14), wherein the characteristics include the sequence number of the instruction, an identifier of the non-register memory to be accessed by the instruction, and a correlation identifier of the non-register memory to a physical register.

26 Claims, 3 Drawing Sheets

PHYSICAL REGISTERS

SUPERSCALAR MICROPROCESSOR HAVING COMBINED REGISTER AND MEMORY RENAMING CIRCUITS, SYSTEMS, AND METHODS

TECHNICAL FIELD OF THE INVENTION

The following embodiments relate to microprocessor technology, and are more particularly directed to a superscalar microprocessor having combined register and memory renaming circuits, systems, and methods.

BACKGROUND OF THE INVENTION

The embodiments described below involve the developing and ever-expanding field of computer systems and microprocessors. Microprocessors operating in a pure sequential order are now being surpassed by so-called "superscalar" microprocessors which can perform more than one instruction execution at a time. Naturally, the ability to execute more than one instruction at a time provides vast increases in processor speed and, therefore, is highly desirable. Typically, however, the superscalar processor must be able to run software written for scalar processors, that is, software which was created with the expectation that each instruction would occur in sequence, rather than anticipating the possibility of parallel operations. As a result, superscalar microprocessor designers are faced with endless complexities where executing two or more successive instructions at once would create some type of conflict. Certain types of conflicts arising from superscalar design are often referred to in the art as "dependencies". In the prior art, certain dependencies arise when two instructions, if executed simultaneously, would adversely affect one another. Various types of such dependencies exist, such as "true" data dependencies and data anti-dependencies, both of which are described using examples below. The examples below also demonstrate the convention for using pseudo code throughout this document.

A true data dependency occurs between successive instructions when the later-occurring instruction requires as an operand the data resulting from execution of the earlier-occurring instruction. For example, consider the following pseudo code instructions of Table 1:

TABLE 1

| Instruction Number | Pseudo Code | Action Taken |
| --- | --- | --- |
| (1) | MOV, AX, BX | AX ← BX |
| (2) | ADD CX, AX | CX ← CX + AX | where,

"Instruction Number" is the sequence in which the instructions appear in a sequential program;

"Pseudo code" is the pseudo code applying typical operations to values stored in any one of three registers, denoted AX, BX, or CX; and "Action Taken" is a representation of the action taken (if any) on the value(s) in the logical register(s) and showing the destination of the result by a left-pointing arrow.

To demonstrate the above convention, when instruction (1) executes, the contents of register BX are stored into register AX. Further, when instruction (2) executes, the contents of register CX are added to the contents of register AX and the result is stored into register CX.

Returning now to the explanation of data dependencies, note that instruction (2) requires AX as one of its operands, but this same operand is the result of executing instruction (1); thus, instruction (2) is said to be data dependent on instruction (1). Given this dependency, and without further action, instruction (2) cannot execute until instruction (1) has executed and stored its result into register AX. Accordingly, without a further technique, instructions (1) and (2) cannot execute in parallel and, therefore, are not amenable to operating in a superscalar sense.

An anti-dependency occurs between successive instructions when the later-occurring instruction, if executed at the same time as the earlier-occurring instruction, would overwrite an operand in the logical register of the earlier-occurring instruction. For example, consider the following pseudo code instructions of Table 2:

TABLE 2

| Instruction Number | Pseudo Code | Action Taken |
| --- | --- | --- |
| (1) | MOV AX, BX | AX ← BX |
| (2) | MOV BX, CX | BX ← CX |

In Table 2, note that instruction (2), if executed at the same time as instruction (1), could overwrite the value in register BX and, therefore, cause an unintended (and likely erroneous) result in the execution of instruction (1). Due to this effect, the relationship between the two instructions is sometimes referred to as a write-after-read (i.e., the second-occurring instruction writes the same register location which is read by the first-occurring instruction). Again, therefore, without a further technique, instructions (1) and (2) cannot execute in parallel and, therefore, are not amenable to operating in a superscalar sense.

The above examples are two types of register dependencies, but are not intended to be exhaustive. Indeed, one skilled in the art will recognize other types of dependencies which either overlap or are independent of those described above. In any event, one thing each of these register dependencies has in common is that the limitations imposed by the dependency, without further action, prevent concurrent execution of the interdependent instructions. However, during years of research and development, various techniques have evolved to eliminate or reduce the effects of these register dependencies so that parallel operations can take place. Some solutions are generated in software, but are often criticized as expecting too much from the programmer's point of view. Better considered solutions are those established in hardware and which, therefore, are transparent to the programmer.

To better understand another factor giving rise to dependencies, consider the popular Intel X86 architecture which includes eight general purpose architectural registers. As known in the art, all of the processor's register operations must occur using these eight registers. Consequently, only a relative few number of registers are available for many different operations. This number of registers may have been acceptable for sequential operation, but with the advancement of superscalar development based on the X86 instruction set, the contention for use of these registers and, hence, the amount of dependencies, is an increasingly common experience.

One solution to avoid some types of dependencies (e.g., anti-dependencies) is known as register renaming and is described in various literature. For example, register renaming is described by Mike Johnson in the book entitled *Superscalar Microprocessor Design*, (PTR Prentice Hall, Inc. 1991), which is hereby incorporated herein by reference. Register renaming is achieved by including an independent set of physical registers internal to the processor.

These physical registers (i.e., the rename registers) outnumber, and store the data intended for, the logical (or architectural) registers such as those eight described above in the X86 architecture. To further accomplish this process, a table keeps track of various information which ultimately directs the result of the instruction execution into one of the rename registers; in this manner, therefore, the architectural register is "renamed" to one of the rename registers. Accordingly, where two instructions in a scalar processor might impose a dependency on the same logical register, now the operand or result is stored in two independent rename registers. Consequently, the dependency is removed and those two instructions can execute concurrently, rather than sequentially. It also should be noted that register renaming by itself will not eliminate a true data dependency. However, the technique may be combined with other techniques (e.g., so-called data forwarding) to improve performance even given the true data dependency. Thus, the register renaming function is often applied to true data dependencies as well.

Although the above addresses limitations created by superscalar operations where few logical registers are available, the inventor of the present embodiments has recognized that dependencies on memory locations, as opposed to logical registers, is an increasing problem. The inventor further forecasts that the problem will continue to increase due to many factors, including those arising in the future. For example, current superscalar processors often execute a few instructions at a time. However, the present inventor has recognized that future superscalar processors will execute many more such concurrent instructions. As a result, more resources could be concurrently accessed, and this could include the same memory location as opposed to the same logical register. As another example, the present inventor has recognized that many programs, both in the past and present, are written to access the same general area within memory. This practice, when combined with concurrent operation execution, increases the possibility that two or more instructions will create a dependency based on the same memory location(s). As yet another example, many computer programs such as X86-based programs tend to access so-called memory stacks, which also by definition appear in the same locations in a given memory. Thus, the present inventor has recognized that access to these stack locations, when combined with concurrent operation execution, will cause dependencies based on the stack location(s).

In view of the above, there arises a need to address the drawbacks of current processors, particularly in view of the constant increases in demand for processor efficiency and performance.

SUMMARY OF THE INVENTION

In one embodiment, there is a method of operating a processor to process a plurality of instructions, wherein each of the plurality of instructions has a respective sequence number. Further, selected ones of the plurality of instructions are for accessing a non-register memory. For each of the selected ones of the plurality of instructions, the method comprises the following steps. One step receives the instruction and another decodes the received instruction. Yet another step stores a plurality of instruction characteristics in a table, wherein the characteristics include the sequence number of the instruction, an identifier of the non-register memory to be accessed by the instruction, and a correlation identifier of the non-register memory to a physical register. Other embodiments, including alternative methods, circuits, and systems are also disclosed.

BRIEF DESCRIPTION OF THE DRAWINGS

For a more complete understanding of the present embodiments, and the advantages thereof, reference is now made to the following descriptions taken in conjunction with the accompanying drawings, in which.

DETAILED DESCRIPTION OF THE PREFERRED EMBODIMENTS

Figure 1:
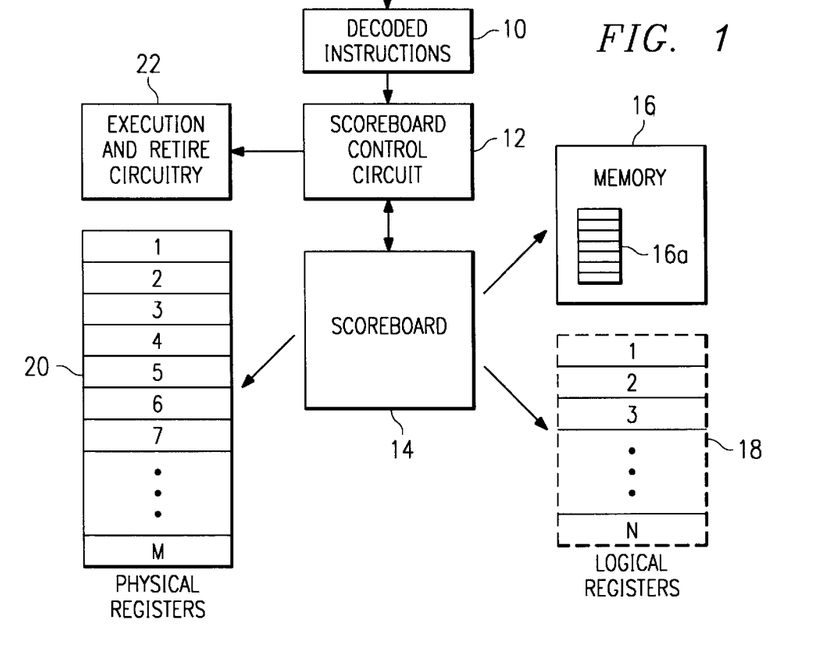
FIG. 1 illustrates a block diagram of the functional components for receiving and decoding a plurality of instructions, and further for storing characteristics of those instructions in a renaming scoreboard.

FIG. 1 illustrates a diagrammatic depiction of elements underlying a first inventive embodiment. In this embodiment, all the blocks other than block 16 are preferably integrated within a single microprocessor integrated circuit and, therefore, combine with various other microprocessor elements to form an overall microprocessor structure. A detailed description of such a microprocessor structure need not be discussed at the outset, but is set forth below in connection with FIG. 5. Turning now to the elements shown in FIG. 1, a decoded instructions block 10 stores an already decoded set of one or more instructions. Methods and circuitry for instruction fetching and decoding are known in the art and need not be detailed for purposes of this embodiment. The decoded instructions are coupled to a scoreboard control circuit block 12 which is further coupled to a scoreboard 14. As detailed below, scoreboard 14 represents a table of information relating to various characteristics of the decoded instruction(s) in block 10. One characteristic is the "logical" resource(s) which the decoded instruction is intended to access. This "logical" resource (or resources), such as a register, memory, flags, or the like, intended to be "accessed" in connection with an instruction may include either or both an operand source for the instruction or a result from execution of the instruction. Another characteristic is the physical resource which will in fact be accessed to read instruction operands or write instruction results. In each of these regards, note also that logical "resource" is used in this document to indicate that an instruction seeks to access, or in fact does access, a location or locations within a memory, register, or other architected facility. Thus, these resources are illustrated in FIG. 1 as a memory 16, a logical registers set 18, and a physical registers set 20. Further, and for reasons detailed below, FIG. 1 includes arrows to depict the general relationship between scoreboard 14 and these resources 16, 18, and 20.

The resources within FIG. 1 are as follows. Memory 16 is typically a memory external from a processor and may be on the order of 8 to 16 Megabytes. Moreover, memory 16 commonly includes an area referred to as a memory stack 16a. Logical register set 18 represents a group of N architectural registers commonly found in scalar processors. For example, an X86 compatible processor, N would equal eight and the registers would be the EAX, EBX, EXC, EDX, ESI, EDI, EBP, and ESP registers, which are included within the Intel X86 specifications. Logical register set 18 is shown using dashed lines because, as detailed below, in this embodiment the values which otherwise would be written to, or read from, these registers are instead mapped by scoreboard 14 to a physical register set 20. Physical register set 20 includes a group of M physical registers which are accessed (i.e., written to, or read from) as the decoded instructions are executed. In this embodiment, M equals 32 so that physical register set 20 consists of a total of 32 registers. The size of each register can vary as discussed below in connection with FIG. 3, but for purposes of the following discussion, let it be assumed that each of the 32 registers within set 20 is an 8-bit register.

FIG. 1 further illustrates that scoreboard control circuit 12 is coupled to execution and retire circuitry block 22. Particularly, the information stored within scoreboard 14 is interpreted by control circuit 12. As a result, and as detailed below, the communication depicted between circuit 12 and block 22 represents that, based on the information in scoreboard 14, control circuit 12 provides control signals to schedule the execution and retiring of the decoded instructions within block 10.

Figure 2:
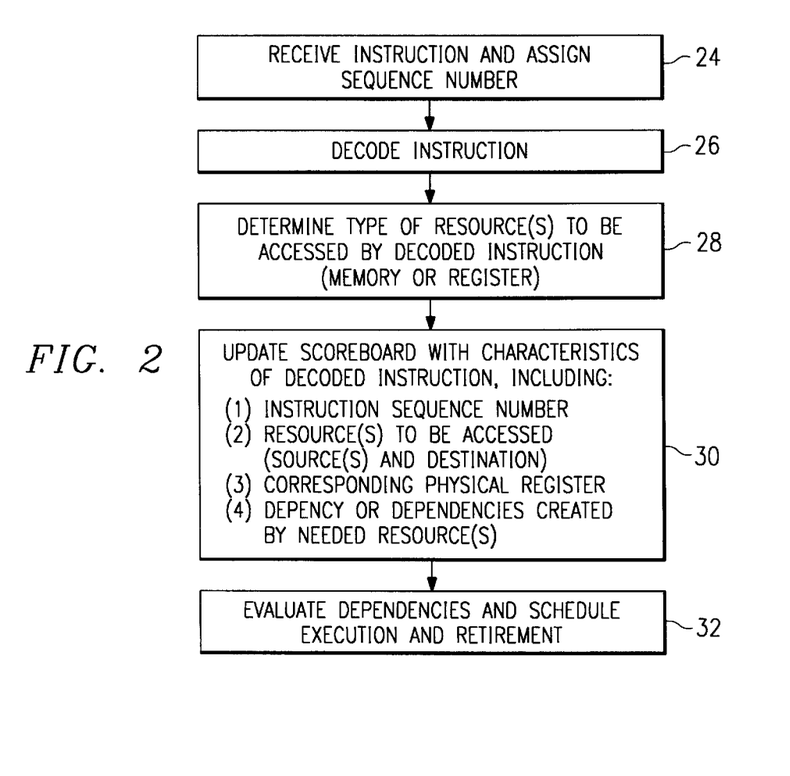
FIG. 2 illustrates a flowchart method of one embodiment using the blocks of FIG. 1.

The operation of the embodiment of FIG. 1 is understood with reference to the flowchart of FIG. 2, as well as with the example depicted in the Tables which follow. As a first example, assume for the sake of simplicity that each register within logical registers 18 and physical registers 20 is one byte wide, that logical register set 18 includes only three registers denoted AL, BL, and CL, and that locations within memory 16 are also accessible only one byte at a time. Given these simplified parameters, the following example tracks the operation of the above embodiment given the instructions in Table 3, immediately below.

TABLE 3

| Instruction Number | Pseudo Code | Action Taken |
|---|---|---|
| (1) | MOV BL, AL | BL ← AL |
| (2) | ADD AL, CL | AL ← AL + CL |
| (3) | MOV [mem@1], AL | [mem@1] ← AL |
| (4) | ADD AL, BL | AL ← AL + BL |
| (5) | ADD CL, [mem@1] | CL ← CL + [mem@1] |

Turning now to FIG. 2, step 24 receives an instruction and assigns a sequence number to it. These numbers reflect the sequence in which the instruction occurs in the actual program code (using whatever intermediate techniques to break down that code and fetch one or more sequential instructions). Thus, from Table 3, the first instruction is assigned the number 1, the second instruction the number 2, and so forth. Step 26 decodes the instruction, and may be performed according to any one of many known decoding techniques. For example, certain decoding methods and circuit systems may be found in U.S. Pat. Nos. 5,408,625, 5,202,967, and 5,371,864, all of which are hereby incorporated herein by reference. Of course, the particular technique chosen should accommodate the functionality of this embodiment, as well as many other requirements deriving from other processor uses of the decoded instruction. Next, step 28 determines the type of resource(s) to be accessed by the decoded instruction, that is, whether an access is to a memory, a register, or other processor stage. Further, recall from above that the determination of an "access" to a resource involves identifying both an operand source to the instruction and/or a result from execution of the instruction. For example, therefore, the resources to be accessed by instruction (1) in Table 3 include logical register AL as a source resource, and logical register location BL as a destination resource. As another example, the resources to be accessed by instruction (2) in Table 3 include register CL as a source, and register AL as both a source and a destination resource. Lastly, the resources to be accessed by instruction (3) in Table 3 include logical register location AL as a source resource, and memory location 1 as a destination resource.

Given the above information about the decoded instruction, in step 30 control circuit 12 updates scoreboard 14 with various characteristics about the decoded instruction. In the preferred embodiment, these characteristics include: (i) the instruction sequence number; (ii) the resources to be accessed by the instruction; (iii) the actual register within physical registers 20 assigned as the destination for the result of the instruction once the instruction is executed; and (iv) any dependencies caused by the instruction given the preceding instructions already processed by control circuit 12 and characterized in scoreboard 14. Before proceeding, note that characteristics (ii) and (iv) interrelate because accessed resources will, by definition, create dependencies. Thus, scoreboard 14 may be updated with both the source and destination resources implicated by a given instruction, and either or both might relate to a dependency.

Having explained the above, Table 4 below depicts in a textual manner one embodiment for storing into scoreboard 14 the instruction characteristics described above, and for instructions (1) through (5) of Table 3. Note also to simplify the illustration that the first entries in Table 4 (and hence, in scoreboard 14) simply depict some starting state where logical registers AL, BL, and CL are initially assigned to correspond to physical registers 0 through 2, respectively.

TABLE 4

| Seq. No | Destination resource | Corresponding physical register | Dependency Information |
|---|---|---|---|
| none | AL | 0 | none |
| none | BL | 1 | none |
| none | CL | 2 | none |
| 1 | BL | 3 | seeks access for source to logical register AL which currently corresponds to physical register 0 |
| 2 | AL | 4 | requires access for source to logical register AL which currently corresponds to physical register 0; requires access for source to logical register CL which currently corresponds to physical register 2 |

TABLE 4-continued

| Seq. No | Destination resource | Corresponding physical register | Dependency Information |
|---|---|---|---|
| 3 | [mem@1] | 5 | requires access for source to logical register AL which currently corresponds to physical register 4; requires completion of instruction seq. no. 2 |
| 4 | AL | 6 | requires access for source to logical register AL which currently corresponds to physical register 4; requires access for source to logical register BL which currently corresponds to physical register 3; requires completion of instructions seq. no. 1 and 2 |
| 5 | CL | 7 | requires access for source to logical register CL which currently corresponds to physical register 3; requires access for source to memory location [mem@1] which currently corresponds to physical register 5; requires completion of instruction seq. no. 3 |

Note further that, as each entry is included within Table 4, the destination resource for that entry is assigned a corresponding physical register. In the illustration of Table 4, the assignment is simply to the next physical register in ascending fashion. However, note that the physical register assignment could be based on additional information which could be included within the table to permit assignment based on prior use of a physical register. For example, if a certain physical register earlier acted as storage and was used for that purpose, but no remaining subsequent instruction required access to the data within that physical register, then that address could then be re-assigned before the register's number were reached in ascending (or circular) fashion.

Reviewing now some specific entries in Table 4, the method embodiment described above may be better appreciated. With respect to the fourth entry in the Table (i.e., sequence number 1), the Table denotes that logical register BL is the destination for the result of the instruction execution and corresponds this result to be stored into physical register 3. Moreover, the entry indicates that the source of the instruction operand (i.e., logical register AL) is stored in physical register 0. With respect to the fifth entry in the Table (i.e., sequence number 2), the Table denotes that logical register AL is the destination for the result of the instruction execution, and that this logical register destination now corresponds to physical register 4. Moreover, the entry indicates that the sources for the instruction (i.e., AL and CL) currently correspond to physical registers 0 and 2, respectively. Note further that this entry does not indicate any dependency between instruction sequence numbers 1 and 2 because the effect of Table 4 removes the anti-dependency of instruction sequence number 2 on instruction sequence number 1.

Continuing with Table 4 as a demonstration of the contents of scoreboard 14, the dependency information stored in the Table may be even further appreciated. With respect to the sixth entry in the Table (i.e., sequence number 3), the Table denotes that memory location [mem@1] is the destination for the result of the instruction execution, and that this memory location corresponds to physical register 5. Moreover, the entry indicates that the source for the instruction (i.e., AL) currently corresponds to physical register 4. Still further, the entry indicates that the current instruction cannot execute until instruction sequence number 2 first executes. In addition to demonstrating the dependency information, this current example further demonstrates that a memory location, as opposed to a logical register, can be assigned to correspond to a physical register in the present embodiment. Thus, when writing the information to the physical register (instead of the actual memory location), certain dependencies can be eliminated. Further, when the information from that memory location is subsequently sought, it may be retrieved from the physical register without having to go to a different source such as a cache or the actual memory register location. These aspects provide notable technical advantages over the prior art. For example, this is highly beneficial for a superscalar processor seeking to concurrently execute two or more instructions, where those concurrent operations seek to access the same memory location. As another example, this renders more efficient those computer programs written, either intentionally or otherwise, to access the same general area within memory. For example, with reference to FIG. 1, memory stack 16a may be often-utilized by programs, particularly in programs using the X86 instruction set. The above-noted embodiment will therefore permit faster and more efficient execution of such programs. As yet another example, when the physical register is subsequently accessed as a source of the memory information, that access is likely to be much faster than an access to a cache or the actual memory location. Still other advantages will be apparent, both now and in the future, to a person skilled in the art.

The remainder of Table 4 is not discussed herein, but should be understandable to a person skilled in the art, particularly given the detailed examples discussed above. It also should now be appreciated that the embodiment improves concurrent instruction execution by corresponding logical register locations to physical registers (e.g., seq. nos. 3 and 4) and further corresponds memory locations (e.g., seq. no. 5) to physical registers as well.

Continuing with FIG. 2, step 32 is accomplished using control circuit 12 where that circuit evaluates the dependency information in scoreboard 12 (as demonstrated by example in Table 4) and schedules the execution of instructions accordingly. Thus, where dependencies have been removed by re-assigning either memory locations or logical registers to physical registers, circuit 12 schedules those instructions for immediate execution. For example, instruction sequence numbers 1 and 2 have no dependencies and, thus, may be scheduled to be concurrently executed. In contrast, when dependencies continue to exist, such as between instruction sequence numbers 2 and 3, circuit 12 ensures execution of those instructions in proper order. In addition, circuit 12 can evaluate the time period for retiring an instruction to ensure in-order instruction completion if such is desired. Control signals in this regard are therefore coupled to block 22 as appropriate.

Having demonstrated a simplified register and memory architecture, the following now demonstrates a more complicated example assuming that logical registers 18 of FIG. 1 consist of a total of three extended four-byte registers denoted EAX, EBX, and ECX, each of which can be accessed in its zero-order byte (e.g., AL for register EAX), its first order byte (e.g., AH for register EAX), its zero and first order bytes (e.g., AX), or as a whole extended four byte entity (e.g., EAX). Assume further that each register within physical register set 20 is 32 bits wide and also can be read by zero-order byte, first-order byte, zero- and first-order byte, or as a whole extended 32 bit quantity. Given these considerations, the following example tracks the operation of the above embodiment given the instructions in Table 5, immediately below.

Additional information also may be included, but is not shown for purposes of simplifying the illustration. For example, a ready bit may be included within the table to show the appropriate fetch from memory has occurred. As another example, the conditional information discussed

TABLE 5

| Instruction Number | Pseudo Code | Action Taken |
|---|---|---|
| (1) | MOVZX EBX, [mem@140] | EBX ← [mem@140] (with zero extension) |
| (2) | ADD CH, BH | CH ← CH + BH |
| (3) | ADD [mem@120], BL | [mem@120] ← [mem@120] + BL |
| (4) | MOV EAX, immediate "1" | EAX ← 1 |
| (5) | ADD [mem@117], EAX | [mem@117] ← [mem@117] + EAX |
| (6) | XCHG [mem@140–141], [mem@119–120] | temp ← [mem@140–141] [mem@140–141] ← [mem@119–120] [mem@119–120] ← temp |

Figure 4:
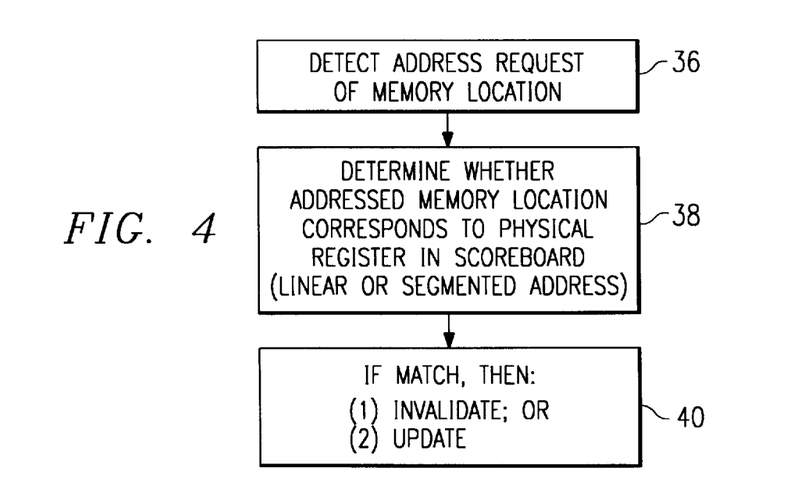
FIG. 4 illustrates a flowchart of an additional methodology embodiment which may be used in conjunction with the other embodiments described above.

Given the above, Table 6 reflects the entries into scoreboard 14 upon the operation of scoreboard control circuit 12 above in connection with FIG. 4 also could be included as well. Proceeding therefore, Table 6 is as follows:

TABLE 6

| Seq. No | Destination resource | Corresponding physical register | Length | Dependency Information |
|---|---|---|---|---|
| none | EAX | 0 | — | none |
| none | EBX | 1 | — | none |
| none | ECX | 2 | — | none |
| 1 | EBX | 3 | 4 | seeks access for source to memory locations [mem140–141] and require extension of upper 16 bits as zero bits |
| 2 | CXH | 4 | 1 | seeks access for source to logical register BXH which currently is first-order byte of the 32 bits stored in physical register 1; requires completion of instruction seq. no. 1 |
| 3 | [mem@120] | 5 | 1 | seeks access for source to memory location [mem@120]; seeks access for source to logical register BXL which currently is zero-order byte of the 32 bits stored in physical register 1; requires completion of instruction seq. no. 1 |
| 4 | EAX | 6 | 4 | requires access to data quantity "1" for immediate storage to register EAX |
| 5 | [mem@117–120] | 7 | 4 | seeks four byte access for source starting at memory location [mem@117] and, therefore, which currently includes data which corresponds to physical register 5 (in [mem@120]); requires completion of instructions seq. no. 3 and 1 |
| 6 | {temp} | 8 | 2 | requires access for source to memory location [mem@140–141] |
| 6 | [mem@140–141] | 9 | 2 | seeks access for source to memory location [mem@119]; seeks access to memory location [mem@120] which currently corresponds to physical register 7; requires completion of instructions seq. no. 1, 3, and 5 |
| 6 | [mem@119–120] | 10 | 2 | requires access for source to temporary storage which currently corresponds to physical register 9; requires completion of instructions seq. no. 1, 3, 5, and first of three sub-sequences of seq. no. 6 | to perform the steps of FIG. 2. Due to the increased complexity of the register set, memory size, and memory alignment, an additional piece of information is added to scoreboard 14, namely, the length of the operation. This information provides an indication of the data quantity to be moved to the destination resource i.e., memory or register).

Table 6 is similar in various respects to Table 4 by demonstrating characteristics of the decoded instructions and, therefore, this discussion need not review all of the information in Table 6. However, it is first again noteworthy that for purposes of improving concurrent instruction execution, Table 6 corresponds logical register locations to physical registers (e.g., seq. nos. 1 and 2) and further corresponds memory locations (e.g., seq. nos. 3, and 5–7) to physical registers as well.

Certain entries in Table 6 represent source operands from memory. For example, instruction sequence number (3) requires data from location [mem@120]. Note that initially this information will be sought from the Table itself, that is, it will be determined whether the memory information has been assigned to a physical register. In the current example, at the time instruction sequence number (3) requires this data, it will therefore be determined that the data is not stored into a physical register associated with the scoreboard. Consequently, the data will be retrieved from other storage, such as a cache or external memory, and forwarded to the user unit (e.g., execution stage) for the appropriate action.

Certain other entries in Table 6 represent destinations to memory. For example, instruction sequence number (3), in addition to seeking information from memory location [mem@120], further creates a result to be stored to that same location. Thus, in addition to storing this result to physical register 5 as shown in the Table, the present embodiment also commits the information to the actual memory location as well to ensure proper coherency.

It is further noteworthy that Table 6 demonstrates added complexities, such as dealing with data quantities of varying lengths as well as information which is misaligned in memory. As an example of varying data quantities, note that instruction sequence number 1 relates to a four byte quantity whereas instruction sequence number 2 relates to a one byte quantity. The length field in Table 6 (and therefore also in scoreboard 14) ensures proper administration of the proper size quantity. As an example of misaligned memory quantities, note that instruction sequence number 5 requires the last three of the four bytes aligned at memory locations [mem@116–119], and further requires the first one of the four bytes aligned at memory location [mem@120–123]. Consequently, even though part of the data (i.e., [mem@116–119]) for instruction sequence number 5 can be immediately retrieved, a dependency still exists on instruction sequence number 3 because it requires the value to be stored at memory location [mem@120]. In addition, while the embodiment of Table 6 depicts only a single entry for sequence number 5, an alternative embodiment may include separate entries into Table 6 for operations requiring access to data which is misaligned in memory. Thus, one skilled in the art should appreciate these greater complexities, and how they are accommodated given the above embodiments.

In addition to the above, Table 6 further demonstrates the storage of dependencies which are therefore reviewable by scoreboard control circuit 12. Again, therefore, circuit 12 evaluates these dependencies and, in response to those dependencies, schedules both execution and retirement of the instructions according to the characteristics set forth in scoreboard 14. For example of a dependency, instruction sequence number 2 cannot execute until instruction sequence number 1 has executed. However, as an example where no dependency exists, instruction sequence number 4 may be immediately scheduled for execution. Again, however, to ensure apparent in-order completion, instruction sequence number 4 will be retired by circuit 12 only after the preceding instructions (i.e., nos. 1–3) have first been retired.

Figure 3:
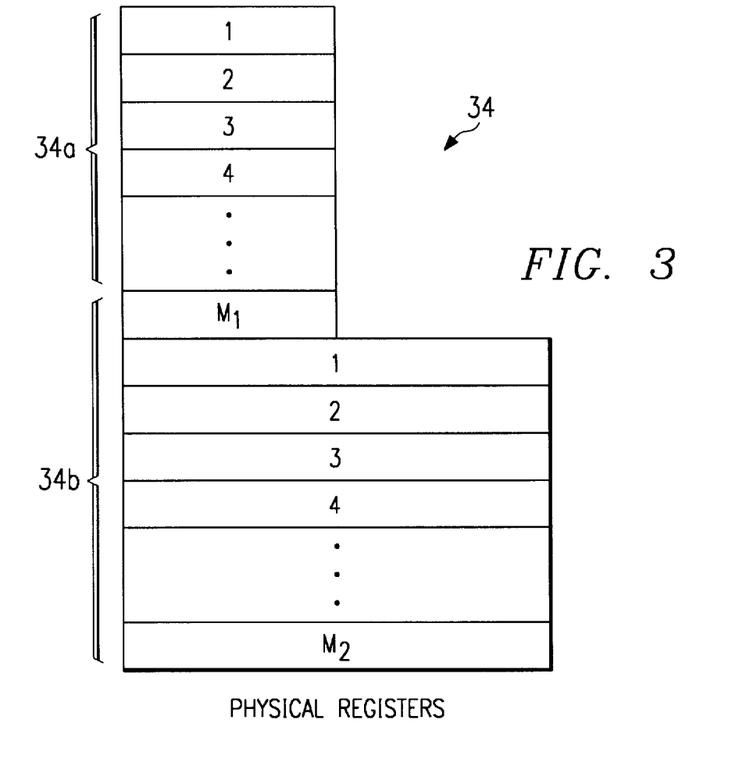
FIG. 3 illustrates as an alternative embodiment a physical register set 34 which may be used in lieu of physical register set 20 in FIG. 1.

FIG. 3 illustrates as an alternative embodiment a physical register set 34 which may be used in lieu of physical register set 20 in FIG. 1. Particularly, physical register set 34 includes two sub-sets of registers denoted 34a and 34b. In this embodiment, register set 34a consists of an integer $M_1$ 16-bit registers and register set 34b consists of an integer $M_2$ 32-bit registers. Moreover, as in the embodiment above, $M_1$ and $M_2$ combine to form a total of 1 through M registers for set 34, and M preferably equals 32. Moreover, the total of 32 registers within set 34 are preferably equally split and, hence, both $M_1$ and $M_2$ equal 16.

Given the architecture of physical register set 34, one skilled in the art will appreciate that such a structure may further enhance performance in view of the added complexities arising from Tables 5 and 6 discussed above. Particularly, as shown above, in various instances a 16-bit quantity, from either a logical register or memory locations, may end up corresponding to a 32-bit physical register. In this instance, half of the register is not used and, therefore, maximum efficiency is not necessarily achieved. Alternatively, however, register set 34 may be used in conjunction with the embodiment above such that movement of data quantities of length two bytes preferably occurs using register set 34a while movement of data quantities of length four bytes preferably occurs using register set 34b. In this manner, no additional bit storage elements are unused.

In addition to the dimensions set forth in FIG. 3, note further that the structure may be modified according to statistical expectation of data routing in connection with scoreboard 14. For example, if four-byte transfers are expected to occur approximately 75 percent of the time, the ratio of $M_1$ to $M_2$ could be 1:3 rather than 1:1. As another example, if it is determined that one-byte transfers occur, the architecture of FIG. 3 could be further modified to include physical registers which are only one byte wide. Again, the expected frequency of use could be evaluated to determine the number of such necessary registers and, hence, the structure could include each of singe byte, double-byte, and quadruple-byte registers, or a subset thereof. Still further, the physical registers of FIG. 3 could be even greater than four bytes wide. For example, in an alternative embodiment, if the physical registers are likely to receive a certain number of bytes from a single fetch, such as the number of bytes in a level one or level two cache, then the FIG. 3 physical registers, or a subset of those registers, are enlarged to accommodate the size of the fetch. Consequently, the larger registers could receive 16 to 32 bytes given current cache widths.

FIG. 4 illustrates a flowchart of an additional methodology embodiment which may be used in conjunction with any of those embodiments described above. Before discussing the flowchart, its overall functionality is first appreciated by recalling from above that the scoreboard embodiments described herein may map physical register locations to external memory locations. Given this possibility, it is further preferable to ensure coherency between the data in the external memory locations and the data in the physical registers of set 20 or 34. The flowchart of FIG. 4 accomplishes this effect.

In step 36, control circuit 12 detects a request to write to a memory location in memory 16 (or other memory as may be appropriate). This detection may occur simply by monitoring an appropriate address and control bus to determine when a request to write to a memory address is placed on the bus. Upon such an occurrence, control circuit 12 continues to step 38 where it determines whether the memory location identified by the address corresponds to a memory location identified in the scoreboard. This process may be accomplished using various well-known techniques. In this embodiment, the address check is preferably accomplished by using the same type of address as carried on an external address bus to address the destination resources stored in the table. For example, returning briefly to Table 6, above, if memory location [mem@120] were addressed by some other system device, control circuit 12 in performing step 38 would address scoreboard 14 with the same type of address bus address to determine that the memory location at issue also was characterized in the scoreboard (i.e., relating to instructions seq. no. 3, 5, and 6).

In step 40, control circuit 12 ensures memory coherency by responding if a match is found in step 38. In this embodiment, the step occurs in one of two alternative preferred techniques. As a first alternative, an invalid flag is set in the scoreboard indicating that data stored in any register corresponding to the memory location at issue is invalid. Continuing, therefore, with the example immediately above, the data in physical registers 5, 7, and 9 could be invalidated in this manner provided the system request for access to memory location [mem@120] occurs before instruction sequence numbers 3, 5, and 6 are not yet retired. In this event, any subsequent attempt to access the information stored in the register will recognize the invalid flag and, therefore, seek access of the memory information from elsewhere (e.g., cache, external memory). As a second alternative, and depending on the timing of the system request to memory location [mem@120], the data in registers 5, 7, and/or 9 could be updated with the identical information that is stored to [mem@120]. Thus, when the information from that memory location is subsequently sought, it may be retrieved from the physical register which now stores valid data and, therefore, there is no need to go to a different source such as a cache or the actual memory register location to retrieve the memory information. In either alternative of information validation, therefore, the system includes a technique whereby the data stored in the registers is not erroneously used in place of the updated information written to external memory.

Figure 5:
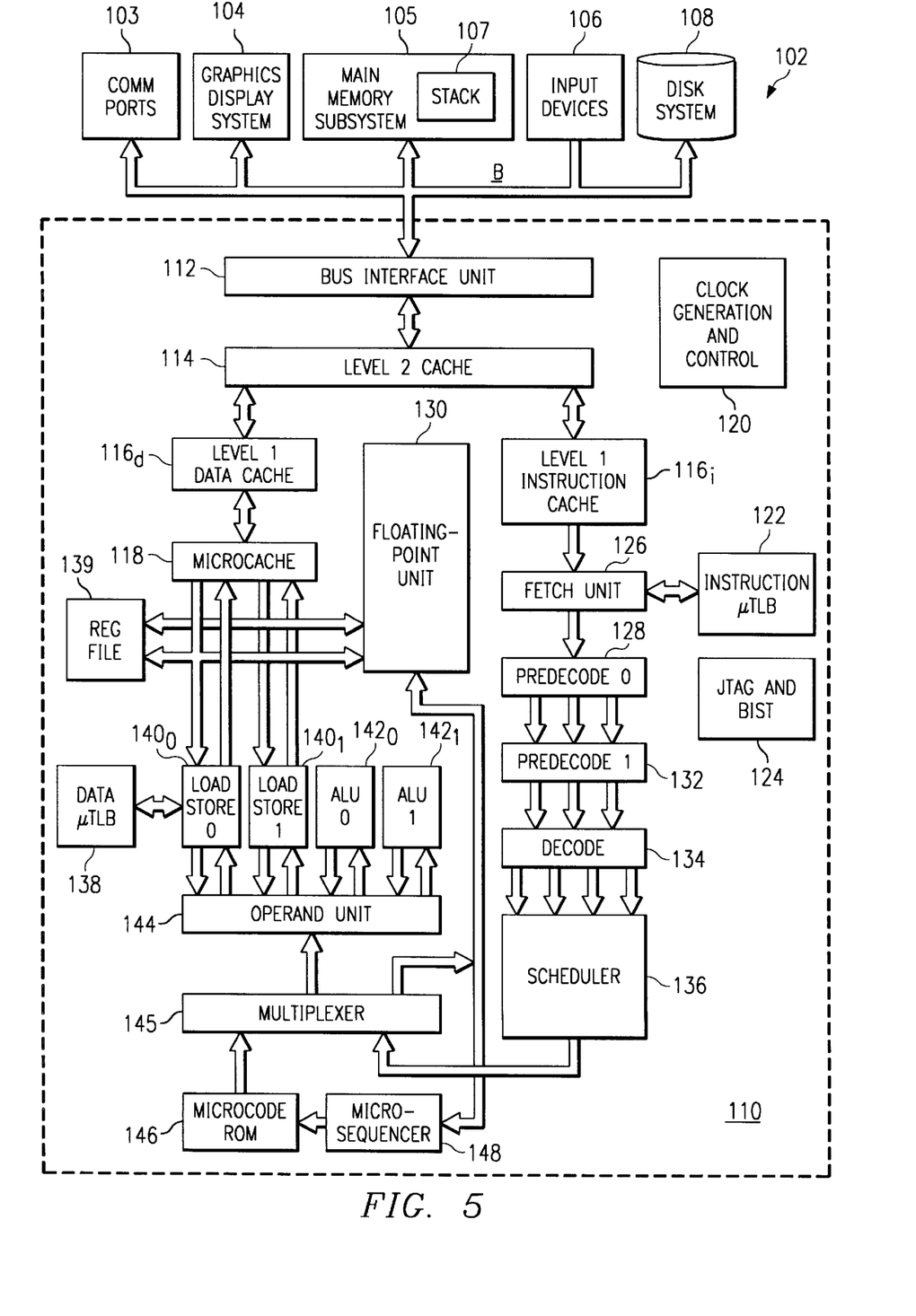
FIG. 5 illustrates a block diagram of a microprocessor embodiment into which the above embodiments may be incorporated.

Having described the above embodiments, FIG. 5 illustrates a block diagram of a microprocessor embodiment into which the above embodiments may be incorporated. Referring now to FIG. 5, an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 5, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a memory stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 5 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 5, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around cache 114, by treating certain bus reads and writes as "not cacheable". Level 2 cache 114, as shown in FIG. 5, is connected to two level 1 caches 116; level 1 data cache 116$_d$ is dedicated to data, while level 1 instruction cache 116$_i$ is dedicated to instructions. Power consumption by microprocessor 110 is minimized by only accessing level 2 cache 114 only in the event of cache misses of the appropriate one of the level 1 caches 116. Furthermore, on the data side, microcache 118 is provided as a level 0 cache, and in this example is a fully dual-ported cache.

As shown in FIG. 5 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs 142$_0$, 142$_1$ for processing conditional branch, integer, and logical operations, floating-point unit (FPU) 130, two load-store units 140$_0$, 140$_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple seven-stage pipeline These stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations(AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write back: This stage stores the results of the execution in registers or in memory |

Referring back to FIG. 5, the pipeline stages noted above are performed by various functional blocks within microprocessor 110. Fetch unit 126 generates instruction addresses from the instruction pointer, by way of instruction micro-translation lookaside buffer ($\mu$TLB) 122, which translates the logical instruction address to a physical address in the conventional way, for application to level 1 instruction cache 116$_i$. Instruction cache 116$_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 5, operand unit 144 receives an input from sequencer 144 and also from microcode ROM 146, via multiplexer 145, and fetches register operands for use in the execution of the instructions. In addition, according to this example, operand unit performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 5, as well as the descriptions above such as those relating to the prior Figures, one skilled in the art may appreciate that the circuit embodiments of FIG. 1 may be incorporated into analogous components shown in FIG. 5. For example, decoding of the instruction may occur with predecode stages 128 and 132 as well as decode stage 132. As another example, scoreboard 14 of FIG. 1 could be included in a memory table to control information in register file 139, as well as accesses to the various caches 114 and 116$i$, as well as main memory subsystem 105. Various related functionality may be further performed by the appropriate circuitry within FIG. 5.

From the above, it may be appreciated that the above embodiments provide numerous technical advantages. For example, the embodiments above give rise to a superscalar microprocessor having combined register and memory renaming which overcomes limitations and drawbacks of the prior art. Particularly, parallel instruction execution occurs more readily and time consuming accesses to external memory are significantly reduced. As another example, there is the advantage of a superscalar microprocessor having improved efficiency. In another example, there is a superscalar microprocessor which removes or substantially reduces dependencies which would otherwise occur when concurrently executed instructions accessed the same resource, that including either registers or memory location (s). As yet another example, the superscalar microprocessor is operable to correctly monitor memory addressing to ensure coherency between renamed memory locations and storage in logical memory. As yet a final example, the superscalar microprocessor scoreboard can be addressed by either a segmented or linear address. Still other advantages of the present embodiments will become apparent to those of ordinary skill in the art having references to the above description, as well as the following claims. In addition, while the embodiments herein have been described in detail, various substitutions, modifications or alterations could be made to the descriptions set forth above without departing from the intended inventive scope. For example, while the resources at issue have focused on registers and external memory, other resource may be corresponded to physical registers as well. As another example, while the X86 instruction set has been mentioned above, various embodiments could apply to other complex instruction set computers as well. Indeed, certain embodiments also could apply to reduced set instruction set computers. As yet another example, certain aspects shown above may be incorporated into separate integrated circuits while others remain with the central core features of the microprocessor; for instance, while memory 16 is typically an memory external from the microprocessor integrated circuit, the embodiments above also may apply to an on-chip memory. Still other examples will be apparent to a person skilled in the art, but should not limit the inventive scope which is defined by the following claims.

What is claimed is:

1. A method of operating a processor to process a plurality of instructions, wherein each of the plurality of instructions has a respective sequence number and wherein selected ones of the plurality of instructions are for accessing a non-register memory, said method comprising for each of the selected ones of the plurality of instructions the steps of:

receiving the instruction;

decoding the instruction;

for the received instruction, storing a plurality of instruction characteristics in a table, wherein said storing step comprises at least the following steps:

storing the sequence number of the instruction;

if the received instruction accesses a non-register memory, storing an identifier of the non-register memory to be accessed by the instruction; and if the received instruction accesses a non-register memory, corresponding the identifier of the non-register memory to a physical register;

detecting if the received instruction includes a request to access to a location in external memory;

upon detecting that the received instruction includes a read request to access a location in external memory, determining whether the external memory location identified by the request corresponds to a non-register memory identified in the table;

upon determining that the received instruction includes a read request to access a location in external memory corresponding to a non-register memory location identified in the table, reading data from the physical register corresponding to the non-register memory; and upon determining that the received instruction includes a write request to access a location in external memory corresponding to a non-register memory location identified in the table, storing a validity indicator in the table indicating that the physical register corresponding to the non-register memory location identified by the request contains invalid information and writing to the location in external memory.

2. The method of claim 1 and further comprising, upon determining that the received instruction includes a read request to access a location in external memory identified by the request corresponds to a non-register memory identified in the table, the steps of:

detecting the state of the validity indicator;

upon detecting that the validity indicator indicates valid data, reading data from the physical register corresponding to the non-register memory location; and upon detecting that the validity indicator indicates invalid data, reading data from the non-register memory location.

3. The method of claim 1, wherein the selected ones of the plurality of instructions accessing a non-memory location include at least two differing data sizes and the physical registers includes distinct sets of physical registers of each of the at least two data sizes, said method wherein:

the step of decoding the instruction decodes an instruction accessing a non-memory location to provide an indication of the data size of the instruction; and the step of corresponding the identifier of the non-register memory to a physical register includes corresponding the identifier of the non-register memory to a physical register having a data size corresponding to the indication of data size of the instruction.

4. The method of claim 3, wherein the selected ones of the plurality of instructions accessing a non-memory location include a selected one of a first data size or a second data size and the physical registers includes a first set of physical registers of the first data size and a second set of physical registers of the second data size, said method wherein:

the step of corresponding the identifier of the non-register memory to a physical register includes corresponding the identifier of the non-register memory to a physical register of the first set if the indication of data size of the instruction indicates the first data size and to a physical register of the second set if the indication of data size of the instruction indicates the second data size.

5. The method of claim 4, wherein the first data size is 16 bits and the second data size is 32 bits.

6. The method of claim 3, wherein the selected ones of the plurality of instructions accessing a non-memory location include a selected one of a first data size, a second data size or a third data size and the physical registers includes a first set of physical registers of the first data size, a second set of physical registers of the second data size and a third set of physical registers of the third data size, said method wherein:

the step of corresponding the identifier of the non-register memory to a physical register includes corresponding the identifier of the non-register memory to a physical register of the first set if the indication of data size of the instruction indicates the first data size, to a physical register of the second set if the indication of data size of the instruction indicates the second data size and to a physical register of the third set if the indication of data size of the instruction indicates the third data size.

7. The method of claim 6, wherein the first data size is 8 bits, the second data size is 16 bits and the third data size is 32 bits.

8. A microprocessor-based computer system, comprising:

an input device;

a display system;

a main memory; and a microprocessor, coupled to the input device, display system and main memory, and for processing a plurality of instructions, wherein each of the plurality of instructions has a respective sequence number and wherein selected ones of the plurality of instructions are for accessing a non-register memory, said processor comprising:

circuitry for receiving an instruction from the plurality of instructions;

circuitry for decoding the instruction; and circuitry for storing a plurality of instruction characteristics in a table, wherein said characteristics comprise the sequence number of the instruction, if the received instruction accesses a non-register memory location said characteristics further comprise an identifier of the non-register memory location to be accessed by the instruction, and a correlation identifier of the non-register memory location to a physical register;

circuitry for detecting if the received instruction includes a request to access to a location in external memory;

circuitry for determining whether the external memory location identified by the request corresponds to a non-register memory location identified in the table responsive to detecting that the received instruction includes a request to access a location in external memory;

circuitry for reading data from the physical register corresponding to the non-register memory location responsive to determining that the received instruction includes a read request to access a location in external memory corresponding to a non-register memory identified in the table; and circuitry for storing a validity indicator in the table indicating that the physical register corresponding to the non-register memory location identified by the request contains invalid information and writing to the location in external memory responsive to determining that the received instruction includes a write request to access a location in external memory corresponding to a non-register memory identified in the table.

9. The system of claim 8 and further comprising, in response to said circuitry for determining that the received instruction includes a read request to access a location in external memory identified by the request corresponds to a non-register memory identified in the table:

circuitry for detecting the state of the validity indicator;

circuitry for reading data from the physical register corresponding to the non-register memory responsive to detecting that the validity indicator indicates valid data; and circuitry for reading data from the non-register memory responsive to detecting that the validity indicator indicates invalid data.

10. The system of claim 8, wherein the selected ones of the plurality of instructions accessing a non-memory location include at least two differing data sizes and the physical registers includes distinct sets of physical registers of each of the at least two data sizes, the system wherein:

the circuitry for decoding the instruction decodes an instruction accessing a non-memory location to provide an indication of the data size of the instruction; and the circuitry for storing a plurality of instruction characteristics in a table stores the identifier of the non-register memory to a physical register having a data size corresponding to the indication of data size of the instruction.

11. The system of claim 10, wherein the selected ones of the plurality of instructions accessing a non-memory location include a selected one of a first data size or a second data size and the physical registers includes a first set of physical registers of the first data size and a second set of physical registers of the second data size, said system wherein:

the circuitry for corresponding the identifier of the non-register memory to a physical register corresponds the identifier of the non-register memory to a physical register of the first set if the indication of data size of the instruction indicates the first data size and to a physical register of the second set if the indication of data size of the instruction indicates the second data size.

12. The system of claim 11, wherein the first data size is 16 bits and the second data size is 32 bits.

13. The system of claim 10, wherein the selected ones of the plurality of instructions accessing a non-memory location include a selected one of a first data size, a second data size or a third data size and the physical registers includes a first set of physical registers of the first data size, a second set of physical registers of the second data size and a third set of physical registers of the third data size, said system wherein:

the circuitry for corresponding the identifier of the non-register memory to a physical register corresponds the identifier of the non-register memory to a physical register of the first set if the indication of data size of the instruction indicates the first data size, to a physical register of the second set if the indication of data size of the instruction indicates the second data size and to a physical register of the third set if the indication of data size of the instruction indicates the third data size.

14. The system of claim 13, wherein the first data size is 8 bits, the second data size is 16 bits and the third data size is 32 bits.

15. A method of operating a processor to process a plurality of instructions, wherein each of the plurality of instructions has a respective sequence number and wherein selected ones of the plurality of instructions are for accessing a non-register memory, said method comprising for each of the selected ones of the plurality of instructions the steps of:

receiving the instruction;

decoding the instruction;

for the received instruction, storing a plurality of instruction characteristics in a table, wherein said storing step comprises at least the following steps:

storing the sequence number of the instruction;

if the received instruction accesses a non-register memory, storing an identifier of the non-register memory location to be accessed by the instruction; and if the received instruction accesses a non-register memory, corresponding the identifier of the non-register memory location to a physical register;

detecting if the received instruction includes a request to access to a location in external memory;

upon detecting that the received instruction includes a request to access a location in external memory, determining whether the external memory location identified by the request corresponds to a non-register memory identified in the table;

upon determining that the received instruction includes a read request to access to a location in external memory corresponding to a non-register memory identified in the table, reading data from the physical register corresponding to the non-register memory; and upon determining that the received instruction includes a write request to access a location in external memory corresponds to a non-register memory location identified in the table, the steps of:

updating information in the physical register corresponding to the external memory location identified by the request so that the information stored in the physical register matches the information in the external memory location identified by the request; and accessing the updated information from the physical register corresponding to the non-register memory location.

16. The method of claim 15, wherein the selected ones of the plurality of instructions accessing a non-memory location include at least two differing data sizes and the physical registers includes distinct sets of physical registers of each of the at least two data sizes, said method wherein:

the step of decoding the instruction decodes an instruction accessing a non-memory location to provide an indication of the data size of the instruction; and the step of corresponding the identifier of the non-register memory to a physical register includes corresponding the identifier of the non-register memory to a physical register having a data size corresponding to the indication of data size of the instruction.

17. The method of claim 16, wherein the selected ones of the plurality of instructions accessing a non-memory location include a selected one of a first data size or a second data size and the physical registers includes a first set of physical registers of the first data size and a second set of physical registers of the second data size, said method wherein:

the step of corresponding the identifier of the non-register memory to a physical register includes corresponding the identifier of the non-register memory to a physical register of the first set if the indication of data size of the instruction indicates the first data size and to a physical register of the second set if the indication of data size of the instruction indicates the second data size.

18. The method of claim 17, wherein the first data size is 16 bits and the second data size is 32 bits.

19. The method of claim 16, wherein the selected ones of the plurality of instructions accessing a non-memory location include a selected one of a first data size, a second data size or a third data size and the physical registers includes a first set of physical registers of the first data size, a second set of physical registers of the second data size and a third set of physical registers of the third data size, said method wherein:

the step of corresponding the identifier of the non-register memory to a physical register includes corresponding the identifier of the non-register memory to a physical register of the first set if the indication of data size of the instruction indicates the first data size, to a physical register of the second set if the indication of data size of the instruction indicates the second data size and to a physical register of the third set if the indication of data size of the instruction indicates the third data size.

20. The method of claim 19, wherein the first data size is 8 bits, the second data size is 16 bits and the third data size is 32 bits.

21. A microprocessor-based computer system, comprising:

an input device;

a display system;

a main memory; and a microprocessor, coupled to the input device, display system and main memory, and for processing a plurality of instructions, wherein each of the plurality of instructions has a respective sequence number and wherein selected ones of the plurality of instructions are for accessing a non-register memory, said processor comprising:

circuitry for receiving an instruction from the plurality of instructions;

circuitry for decoding the instruction; and circuitry for storing a plurality of instruction characteristics in a table, wherein said characteristics comprise the sequence number of the instruction, if the received instruction accesses a non-register memory said characteristics further comprise an identifier of the non-register memory location to be accessed by the instruction, and a correlation identifier of the non-register memory location to a physical register;

circuitry for detecting if the received instruction includes a request to access to a location in external memory;

circuitry for determining whether the external memory location identified by the request corresponds to a non-register memory location identified in the table responsive to detecting that the received instruction includes a request to access a location in external memory;

circuitry for reading data from the physical register corresponding to the non-register memory responsive to determining that the received instruction includes a read request to access a location in external memory corresponding to a non-register memory location identified in the table;

circuitry for updating information in the physical register corresponding to the external memory location identified by a write request so that the information stored in the physical register matches the information in the external memory location identified by the request responsive to determining that the external memory location identified by a write request corresponds to a non-register memory location identified in the table; and circuitry for reading the updated information from the physical register corresponding to the non-register memory location responsive to determining that the external memory location identified by a read request corresponds to a non-register memory location identified in the table.

22. The system of claim 21, wherein the selected ones of the plurality of instructions accessing a non-memory location include at least two differing data sizes and the physical registers includes distinct sets of physical registers of each of the at least two data sizes, the system wherein:

the circuitry for decoding the instruction decodes an instruction accessing a non-memory location to provide an indication of the data size of the instruction; and the circuitry for storing a plurality of instruction characteristics in a table stores the identifier of the non-register memory to a physical register having a data size corresponding to the indication of data size of the instruction.

23. The system of claim 22, wherein the selected ones of the plurality of instructions accessing a non-memory location include a selected one of a first data size or a second data size and the physical registers includes a first set of physical registers of the first data size and a second set of physical registers of the second data size, said system wherein:

the circuitry for corresponding the identifier of the non-register memory to a physical register corresponds the identifier of the non-register memory to a physical register of the first set if the indication of data size of the instruction indicates the first data size and to a physical register of the second set if the indication of data size of the instruction indicates the second data size.

24. The system of claim 23, wherein the first data size is 16 bits and the second data size is 32 bits.

25. The system of claim 22, wherein the selected ones of the plurality of instructions accessing a non-memory location include a selected one of a first data size, a second data size or a third data size and the physical registers includes a first set of physical registers of the first data size, a second set of physical registers of the second data size and a third set of physical registers of the third data size, said system wherein:

the circuitry for corresponding the identifier of the non-register memory to a physical register corresponds the identifier of the non-register memory to a physical register of the first set if the indication of data size of the instruction indicates the first data size, to a physical register of the second set if the indication of data size of the instruction indicates the second data size and to a physical register of the third set if the indication of data size of the instruction indicates the third data size.

26. The system of claim 25, wherein the first data size is 8 bits, the second data size is 16 bits and the third data size is 32 bits.

* * * * *

UNITED STATES PATENT AND TRADEMARK OFFICE
CERTIFICATE OF CORRECTION

PATENT NO. : 5,911,057
DATED : 6/8/99
INVENTOR(S) : Jonathan H. Shiell

It is certified that error appears in the above-identified patent and that said Letters Patent is hereby corrected as shown below:

Cover Page, insert Item [60] under Related U.S. Application Data

--Provisional Application No. 60/008,864 December 19, 1995.--

Signed and Sealed this

Eighth Day of May, 2001

*Attest:*

NICHOLAS P. GODICI

*Attesting Officer*  *Acting Director of the United States Patent and Trademark Office*